Sept. 1, 1931. W. A. DARRAH 1,821,209
APPARATUS AND PROCESS FOR MAKING BOARDS
Filed March 23, 1929
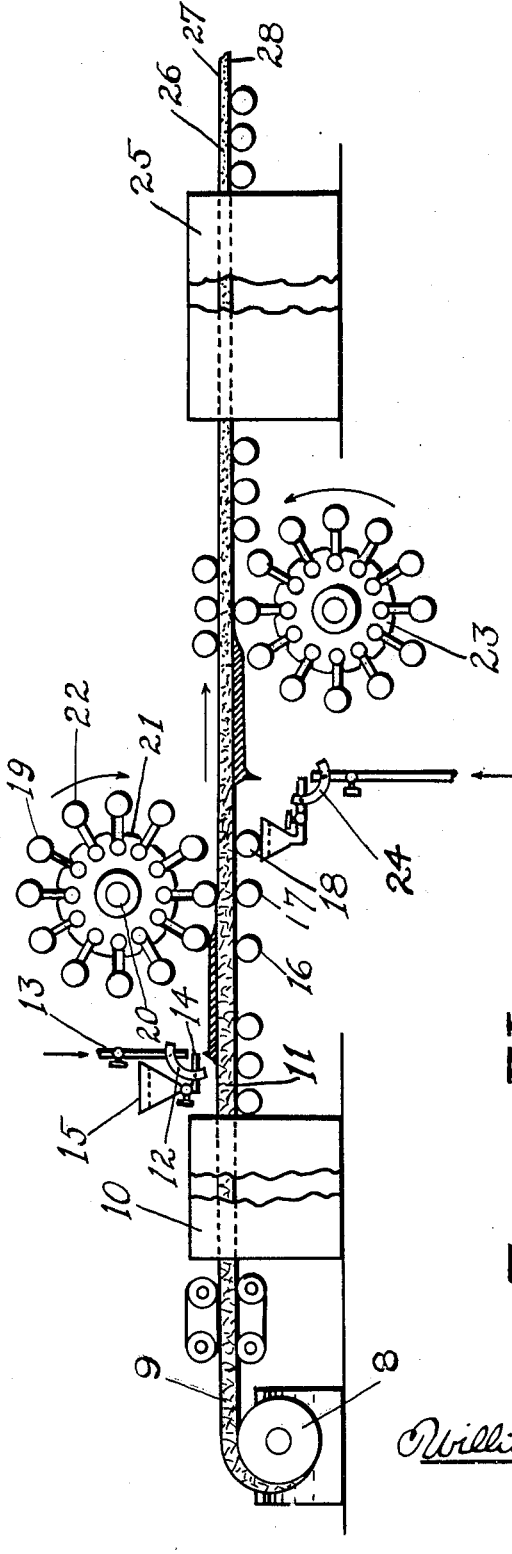

Patented Sept. 1, 1931

1,821,209

UNITED STATES PATENT OFFICE

WILLIAM A. DARRAH, OF CHICAGO, ILLINOIS

APPARATUS AND PROCESS FOR MAKING BOARDS

Application filed March 23, 1929. Serial No. 349,395.

This invention relates to methods and equipment for producing a board, as for example one formed of cellulose material, although I do not wish to confine my invention to this raw material alone.

Boards of the type which can be produced by my process are largely used as sheathing in constructing, building, insulation for walls, roofs, etc., or in the construction of such articles as boxes, containers, ovens, furniture, etc.

Some of the objects of my invention are to produce a board which will be strong, light and economical in cost, using commonly available fibers such as those obtained from wood, straw, corn and similar vegetable products.

It is quite common in the industry today to produce a board which has a relatively light and open structure and, therefore, provides comparatively good heat insulation.

There are also a few boards available on the market which are hard, dense and strong, but which because of these characteristics do not provide a material amount of insulation.

One of the objects of my invention is to provide a board which offers the strength and hardness of one type of product with the lightness and insulating quality of another type of product.

Most boards made from fibers are put through a process somewhat similar to the manufacture of paper, with the exception that the thickness of the final product is much greater than in the case of the manufacture of paper. The sheet or web is usually formed by passing a water suspension of the fiber through or over a screen of such a structure that the fibers or a considerable part of them are withdrawn from the solution and remain on the screen while the water passes through the screen. The sheet thus formed is frequently pressed and then usually dried, giving the commercial product today. In carrying out the process of my invention, I can usually start with the board which leaves the dryer in the present commercial process and I do not claim in this patent the steps of forming the sheet or web as many well known processes may be used as a preliminary to applying my process.

The drawings show diagrammatically the steps of my process and one form of equipment which may be employed.

Referring to the drawings:

Figure 1 represents in cross section a portion of a sheet of board as manufactured today with a substantially uniform or homogeneous structure throughout its thickness.

Figure 2 shows in cross section a portion of a board as manufactured today, with the preliminary coating applied in accordance with my process.

Figure 3 shows diagrammatically a board prepared in accordance with my process, while Figure 4 shows the elements of the equipment necessary to carry out my process.

In Figure 1, 1 represents the board as made by present processes, which it will be noted consists of a mass of fibers interlocked and dried. In Figure 2 I have indicated a similar mass of interlocked fibers by 2 and a layer 3 and 4 of surfacing material which may represent moist fibers, fine ground wood pulp, a slurry of clay, lime or other materials including various waste materials. In Figure 3, 5 represents the core of the finished board, while 6 and 7 represent hard dense layers which will be described subsequently in this specification. Figure 4 shows diagrammatically a portion of the equipment suitable for preparing board in accordance with my process. 8 represents a forming machine delivering a board 9 to a dryer 10, the dried board leaving dryer 10 and indicated by 11. Up to this point many of the present available commercial processes may be utilized. The board at point 11 is relatively dry. The exact amount of moisture is not essential, but for purposes of convenient control it is desirable to have the board in the condition known as commercially dry for reasons later to be described. 12 indicates a device for applying moisture or other material to the upper surface of board 11. For purposes of diagrammatic illustration, 12 may be considered to consist of a compressed air pipe 13 and a feed pipe 14, the compressed air pipe terminating near the end of pipe 14 and serving to atomize the material from pipe 14, forcing it directly upon board 11. If desired pipe 14 may be connected to reservoir 15 holding a supply of the desired liquid. The arrows indicate the direction of flow of the air and liquid.

16, 17 and 18 represent diagrammatically supporting rolls for the board 11. These may be driven or serve as idlers depending upon the arrangement of the equipment. Located approximately above rollers 16, 17 and 18 and preferably approximately directly above one of them is beating device 19, which consists of a supporting shaft or roll 20, carrying a spider 21 which supports a series of flexible arms 22 preferably pinned to spider 21 in such a manner as to permit of ready movement about a fixed point. Driving means (not shown) are of course used to rotate beater member 19 at the desired velocity. Beater member 19 serves, of course, to condition the upper surface of board 11, while another beater member 23 which may be similar to 19 if desired, serves to condition the under surface of board 11. Member 24 serves to deliver liquid material to the under surface of board 11 prior to the passing of the board under conditioning member 23. Means are provided for adjusting the distance between the point at which the liquid is added to the surface of the board and the point at which the surface of the board carrying the liquid is conditioned by the beater. 25 indicates an additional drying equipment which may or may not be utilized depending upon the amount of liquid added during the surfacing process.

26 indicates the board after leaving the dryer in what may be called its finished condition, while 27 and 28 indicate the surface layer of hard material which has been added during the processing.

It will be apparent that if an open porous board can be given a surface which is hard and dense that for most purposes the board will be as strong as a board which is dense throughout its cross section. On the other hand, a board having an open porous center structure and an outer dense hard layer will give materially greater heat resisting value than a board which is dense throughout. Such a board will also be less expensive because it will contain less material than a board of the same thickness having a high density throughout its cross section.

If it is attempted to compress a board after it is formed and dried, the pressure will produce a board of approximately uniform density throughout its entire cross section. This result is more or less obvious when it is considered that all sections of the board have a substantially uniform resistance to pressure, even though they may vary to some extent in the size and nature of the fibers or other distribution.

If, on the other hand, it is attempted to compress a board before it is entirely dry the usual result is to form a board which is somewhat denser in the central portion than in the outer portion. This results from the fact which I have discovered, that the presence of a liquid in the board (such as water) appears to materially assist in giving the board a permanent compression. A board, therefore, which is compressed before being completely dried is naturally a board which contains appreciable amounts of water on the inner portion and since the drying normally takes place from the surface, a board compressed under the conditions described above would show a slightly denser core than outer surface.

It will be obvious, that if the moisture in the wet board is distributed approximately uniformly throughout its cross section the effect of compression will be distributed substantially equally throughout the cross section of the board.

In order, therefore, to produce a board having a denser surface layer than interior layer, I have found it advisable to first place the board in such condition that the surface layer contains more available moisture than the interior portions. Such a result can be obtained momentarily by spraying water only on the surface of a substantially dry board as it takes an appreciable period of time for the water to penetrate into the interior of the board. Most boards, however, so readily absorb the moisture that the time interval required for the moisture to penetrate from the surface of the board to a considerable depth below the surface is very small. Further, this time interval is variable, depending upon the condition of the board.

I, therefore, found it quite helpful in many cases to add to the surface of the board instead of water only, a mixture of water (or other desired liquid) and some material which will retard the travel of the water into the board. This has the effect of permitting close control of the depth to which the moisture penetrates even in spite of large variations in the condition and nature of the board. I also obtain another result by this procedure in that the material mixed with the water has in itself a certain affinity for the water and thus holds a definite quantity of water on the surface. This amount of water held on the surface by the material is of course in condition to be released or made available during the surface treatment of the board, as will later be described.

I have found that by adding to the necessary amount of water definite amounts of finely ground wood pulp, wood flour, short wood fibers or even long wood fibers, and spreading this material in a substantially uniform but thin layer over the top of the board, I can quite definitely control the rate of penetration of the moisture into the board, and the depth to which it will pass within a given time. This effect may be amplified by using a material which has a somewhat higher affinity for water than ordinary wood fiber, thus cellulose hydrate will increase the effect mentioned in many cases. Similar results of course may be obtained by adding such materials as caustic-soda or otherwise treating the fibers or particles of wood.

I have found, however, that it is not necessary to confine the mixture to water and cellulose materials, as slurries made from lime and water, clay and water, silica gell, soap solutions and other well known colloidal materials may be used to advantage in certain cases. I may on occasion add substances which have hygroscopic properties to the slurry although in this case it is desirable to select substances which after final treatment will lose their hygroscopic power as otherwise the board will have a tendency to absorb moisture from the air when in use.

Having now applied a layer of slurry to a surface of the board, the board should be subjected to pressure of considerable intensity. I have found that under these conditions the effect of the pressure is primarily to compress the portion of the board in which the fibers are decidedly wet, or if the other portion of the board is also compressed the fibers in the dry portion appear to retain a resiliency sufficient to permit them to spring back to substantially the same position that they originally occupied. This resiliency does not appear to be present in nearly as large a degree in the case of the wet fibers, although it is undoubtedly present to some extent. The net result of the combined steps of moistening a portion of the fibers and applying pressure is, therefore, to form a denser layer on the surface portion without materially increasing the density of the inner portion. When a slurry material is present in addition to water, the colloidal portion of the slurry is of course driven into the surface and indeed penetrates the board to an appreciable extent. This has the added effect, therefore, of filling some of the crevices between the fibers and therefore further assists in forming a dense hard surface.

It will be noted that the moisture penetrates into the interior of the board in such a manner that the amount of moisture will be very low in the central portion of the board and will increase consistently toward the surface of the board. As a result of this condition it will also be apparent that the hardened surface will not be a single layer which can be readily peeled or removed from the board, but the board will show a gradual change of density with a maximum on the outer surface or near to it or a minimum within the board.

It will be apparent that the slurry which holds a definite amount of water will part with a portion of this water when subjected to pressure and not until then. This factor is of further assistance in controlling the depth of the hard surface layer.

I have found it a decided advantage in many cases to use a slurry or liquid which is quite warm and I also prefer to have the board itself warm when the treatment is applied. It should be understood, however, that heating is not essential in all cases. The effect of heat in most cases is to hasten the operation and permit the formation of the harder surface.

The addition of pressure to the surface of the board after the moistening may be accomplished in many ways. By passing the board through a series of rollers a decided surface hardness may be secured. It is also possible to obtain this result by placing the board between the platens of a press after the addition of moisture to the surface of the board and squeezing the board between the platens.

The method which I prefer, however, consists in pressing and rubbing the surface of the board simultaneously as for example, by passing the board between rollers which are sufficiently close together to exert a decided pressure and rotating the roll in contact with the wet side of the board, in such a manner that it will travel at a definitely higher speed than the board itself. In this case, I prefer to have the rolls heated to a relatively high temperature, as this serves to dry the additional moisture and leaves the board in a strong hard condition. Another method which I have found effective in certain cases is to subject the board to the action of a series of loose hammers which are forced against the board by centrifugal action. The hammers in this case should have an end smooth or polished, so that they will not tear the board but will compress it and rub it. In this case, the hammers should revolve at a speed many times higher than the linear travel of the board, and the result is in many cases to produce a smooth, hard surface which frequently has a polish.

After the compression and rubbing, the board may then be subjected to additional drying when it is ready for commercial use. Obviously if the amounts of moisture added in the surface layer were small, proper drying may be accomplished by the steam heated rolls during the pressing operation, but if a thick layer of considerable density is required, it is usually advisable to provide additional means for drying the board.

In connection with the drying operation, it should be kept in mind that the process which I have invented offers decided advantages which result in materially reducing the cost of making the board and the first cost of the necessary equipment.

It is well known that the drying of board which is hard and dense is a relatively difficult matter, owing to the comparatively slow rate of travel of moisture from the center of the board to the surface which is of course a limiting factor of drying operations of this kind.

If it is desired to produce a board with a hard dense surface and a porous interior, the problem of drying becomes almost prohibitive owing to the slow rate of travel of moisture through the case hardened surface and the large amount of moisture contained within the interior of the board.

It is not unusual when attempting to dry case hardened board to find that the drying time is increased twofold or in some cases tenfold.

On the other hand, in the process which I have invented it will be noted that the interior of the board is commercially dry or substantially so and the moisture which must be removed is principally that residing in the surface. This condition, of course, results from the fact that the board is given the main drying while the surface is open and porous. This advantage is an extremely important one, as it permits the elimination of large amounts of costly machinery and greatly increases the amount of production from a given plant.

It will be apparent that the surface layer of the board may contain other materials than the slurry only. I have found that the addition of an emulsion of certain oils or waxes has the effect of rendering the surface waterproof even though the percentage of the emulsion is extremely small, for example I may make an emulsion containing approximately one part of an emulsifier (such as for example diethyline glycol) with a mineral oil, paraffin, tar, etc., suspended in water. By adding even a few percent of such an emulsion to the slurry the beating and rolling action in hardening the surface of the board appears to set free the drops of oil in the emulsion allowing them to coalesce giving an appreciable water proof effect. I have even produced quite satisfactory hard surfaces by using as a slurry a water emulsion in a consistency similar to glue, of an oil, tar or wax. Such a procedure serves to supply the necessary water for the softening and subsequent compression of the surface fibers and, at the same time gives a smooth, hard water proof coating by destroying the emulsion when the board is pressed. The application of heat is quite advantageous when dealing with emulsions of this type.

By the addition of an inert slurry such as clay or lime to the emulsion either with or without wood fiber or flour, I am able to produce a board by the process here outlined in which the interior is soft and light while the surface is relatively hard, dense and water proof. The addition of proper amounts of inert material such as lime, clay, etc., also serves to make the surface of the board fireproof which in many cases is a very desirable characteristic.

It will be apparent that many modifications may be made in the design and arrangement of the equipment here described and the steps of the process which I have invented, without departing from the spirit of this invention. It will also be apparent that the materials mentioned specifically are for purposes of illustration and many equivalent materials may be substituted without exceeding the scope of this invention.

I do not wish to confine this invention to any particular class of raw material in manufacture of board, as the process, apparatus and product can be applied by making various obvious modifications to almost any board constructed of fibers. Among fibers well suited for this process are those normally obtained from wood and such others as may be obtained from corn stalks, straw, bagasse, cotton stalks, peat, alfalfa, flax and many others.

It should be understood that while I have referred to the method of heating the board and to the use of heated rolls I may obviously obtain the desired heat for carrying out my process by the friction or other work done upon the board and by the roller or other pressing device. It should therefore be understood that I do not of necessity require separate and specific heating means other than the mechanical working means.

I wish to point out that process which I have disclosed gives a product in which the surface portion of the board is thoroughly interlocked with the interior portion of the board, due to intermingling of the fibers, and as a result of this condition the surface portion of the board is not subject to peeling or splitting away from the interior of the board. The process which I have disclosed, therefore, is a distinct advance over those other processes in which a surface layer is formed independently of the board and then added to the surface of the board and pressed or otherwise fastened. Such an arrangement is frequently open to the objection that the outer surface has a tendency to peel or separate from the main portion of the board.

Having now fully described my invention, what I claim as new and wish to secure by Letters Patent in the United States, is as follows:

1. The process of making board which consists in first forming the sheet of substantial thickness with a substantially uniform structure throughout, second removing a portion of water from said sheet, third moistening the surface portion of said sheet for a limited depth only and finally pressing said sheet while said surface is moistened.

2. The process of making board of substantial thickness which consists in first forming the sheet with a substantially uniform structure throughout, second removing water from said sheet, third moistening the surface portion of said sheet for a limited depth only and finally heating and pressing the surface of said sheet.

3. In the process of making board of substantial thickness the step of moistening the surface portion for a controlled depth only and subjecting the board to pressure while the surface portion is moistened.

4. In the process of making board of substantial thickness the step of moistening the surface portion for a controlled depth only and subjecting the board to pressure and heat while the surface portion is moistened.

5. In the process of making board of substantial thickness the step of moistening the surface portion for a controlled depth only and subjecting the surface of the board to pressure and a rubbing action while moist.

6. The process of making board which consists in first forming the sheet, second subjecting said sheet to a drying operation, third applying a moistening slurry to the surface of said sheet, and fourth pressing and rubbing said surface while the moisture has penetrated to only a limited depth.

7. The process of making board which consists in first forming said board, second drying said board, third adding a slurry consisting of cellulose material and water and finally pressing and rubbing the surface of said board within a controlled time after the addition of said slurry to said surface.

8. In the process of forming board with a hard surface the step of first subjecting said board to a drying operation, second adding a slurry to the surface of said board to obtain a controlled and graded moisture content being greatest at the surface of the board and least adjacent the central portion of said board.

9. The process of controlling the moisture content in a board previously dried by adding a slurry containing water and water absorbent material to the surface of said board and then pressing and rubbing said board.

10. The process of treating board of substantial thickness and made of fibers throughout which consists in first forming said board, second partially drying said board, third moistening the surface of said board to a controlled depth, fourth pressing said board and finally again drying said finished product.

11. An apparatus for treating board consisting of a device for applying slurry to the surface of said board and a rotating pressing device arranged to simultaneously press and rub the surface of said board after the application of said slurry.

12. In a device for treating board a rotary pressing member consisting of a series of movable members supported by a central member and arranged to simultaneously press and rub the surface of said board.

13. The process of treating a board which consists in first adding to the surface of a board a slurry containing water, a water absorbent material and a colloidal suspension of a waterproofing material, permitting said slurry to remain on the surface of said board a controlled time and finally subjecting said board to pressure.

14. An apparatus for treating board consisting of a dryer for said board, a device for applying a liquid to the surface of said board, a device for simultaneously rubbing and pressing the surface of said board after the addition of said liquid and a second drying device.

15. An apparatus for treating board consisting of a dryer for said board, a device for applying a liquid to both surfaces of said board, a device for pressing the surface of said board, and supporting means arranged to transfer said board in a substantially horizontal plane throughout said treating.

16. An apparatus for treating board consisting of a substantially horizontal supporting device, a device arranged to apply moisture to the surface of said board, and a member designed to apply pressure to said board arranged beyond the position of said moisture applying device.

17. In the process of making boards of substantial thickness the step of applying to the surface of said board a substance containing wood pulp and water and subsequently subjecting said board to pressure and heat.

18. In the process of making board of substantial thickness the step of applying to the surface of said board a mixture containing wood pulp, water and a water proofing material and subsequently subjecting said board to pressure and heat.

19. In the process of making board of substantial thickness the step of subjecting said board to the simultaneous action of heat and pressure while the surface of said board contains a higher percentage of moisture than the interior thereof.

WILLIAM A. DARRAH.